Patented Jan. 2, 1940

2,185,661

UNITED STATES PATENT OFFICE 2,185,661

SUBSTITUTED 3-AMINOPYRENES AND PROCESS OF PREPARING THEM

Martin Corell and Heinrich Vollmann, Frankfort-on-the-Main, and Hans Becker, Hofheim in Taunus, Germany, assignors to General Aniline Works, Inc., New York, N. Y., a corporation of Delaware No Drawing. Application February 10, 1937, Serial No. 125,140. In Germany February 18, 1936

4 Claims. (Cl. 260—518)

The present invention relates to substituted 3-aminopyrenes and to process of preparing them.

By the disubstitution of pyrene there are generally formed mixtures of pyrene-3,8-di-derivatives with the corresponding pyrene-3,10-di-derivatives.

The separation of the constituents of these mixtures of disubstituted pyrenes involves in most cases considerable losses since the differences in solubility of the isomerides are very small and necessitate repeated fractional crystallization. The dinitropyrene, for instance, which may be obtained with a very good yield in the dinitration of pyrene has already been described by several experts (cf. Gräbe, "Annalen der Chemie", vol. 158, pages 292 to 293; E. Goldschmidt, "Monatshefte der Chemie", vol. 2, page 580; and Jahota, "Monatshefte der Chemie", vol. 8, page 449) without the fact that it is a mixture having been observed. By repeatedly extracting the crude dinitropyrene with boiling pyridine and repeated fractional crystallization of the residue, we succeeded in separating pure 3,8-dinitropyrene (long, lustrous, light-yellow needles when crystallized from nitrobenzene; melting point 309° C.) from the mixture in moderate yield, whereas the 3,10-isomeride could not be isolated in pure form.

We have found, that mixtures of isomeric 3,8- and 3,10-pyrene-di-derivatives may be separated into their components in a relatively simple manner when at least one of the two substituents of the components is an amino-group, i. e. when the mixtures contain compounds of the following scheme:

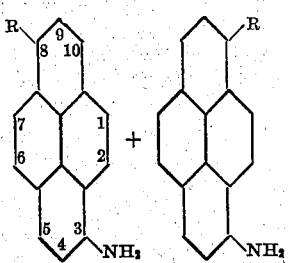

wherein R represents a substituent, for instance, amino, acetyl amino, acetyl, chlorine or carboxyl. The difference in solubility of these aminopyrenes is considerably greater than in the case of the corresponding nitropyrenes so that the isomerides may be separated often by a single operation by treatment with solvents, for instance, with organic solvents, or, since also the salts of these amines show large differences in solubility, with aqueous strong acids. Thereby we have found that the 3,8-derivatives of pyrene of the above formula are less soluble than the 3,10-derivatives. As organic solvents there may be used with especially good results, for instance, alcohol, benzene, chlorobenzene, toluene, xylene, pyridine.

The individual aminopyrenes of this invention are useful as intermediates for the manufacture of dyestuffs.

The following examples serve to illustrate the invention, but they are not intended to limit it thereto; the parts are by weight:

(1) 77 parts of dinitropyrene, melting at 280° C to 290° C., (being a mixture of 3,8- and 3,10-dinitropyrene, obtainable by nitrating pyrene in glacial acetic acid with 2 mols of nitric acid of specific gravity 1.5, or by nitrating finely divided 3-nitropyrene in water with nitric acid at 70° C. to 80° C.) in 550 parts of alcohol are treated at 70° C. in an autoclave provided with a stirrer with hydrogen in the presence of 2 per cent. of a nickel catalyst until the pressure no longer decreases. After cooling, the whole is filtered with suction, the alcoholic filtrate containing the 3,10-diaminopyrene and the solid residue containing the 3,8-diaminopyrene. The residual solid matter is treated with boiling xylene wherein the 3,8-diaminopyrene dissolves and the solution is freed from the nickel catalyst by filtration. The 3,8-diaminopyrene separates from the filtrate after cooling to room temperature in a nearly pure state. After recrystallization from xylene or trichlorobenzene the 3,8-diaminopyrene is pure. It has a constant melting point of 232° C.

to 233° C. and dissolves in concentrated sulfuric acid to a colorless solution having a strong violet fluorescence.

The alcoholic filtrate is concentrated and the solid matter is recrystallized from toluene or xylene. The 3,10-diaminopyrene is thus obtained in the form of large prisms which have a constant melting point of 162° C. Good specimens of these crystals of both isomerides have a dark-olive color whereas the color turns pure yellow when the crystals are triturated.

(2) 29.2 parts of dinitropyrene, melting at 280° C. to 290° C., are suspended in 250 parts of alcohol and a solution of 57 parts of sodium hydrosulfide of 30 per cent. strength and 60 parts of water are added thereto. After about a quarter of an hour the same quantity of sodium hydrosulfide is again added and the whole is boiled until the violet solution has become yellow. After cooling, the whole is filtered with suction, the solid matter is washed with water and dried. The yield amounts to 18 parts of crude diaminopyrene, melting at 160° C.

18 parts of this diaminopyrene are heated to boiling for a short time with 360 parts of sulfuric acid of 20 per cent. strength and 96 parts of water. The sulfate of 3,8-diaminopyrene which is thus produced separates in the form of light-grey needles. The whole is filtered with suction while hot, and the separated sulfate is rendered alkaline by means of ammonia whereby cleavage of the sulfate occurs. The free amine is filtered with suction and dried. When recrystallized from xylene it melts at 230° C. to 232° C. and is pure 3,8-diaminopyrene.

The sulfate of the 3,10-diaminopyrene precipitates from the sulfuric acid filtrate on cooling; after rendering the sulfate alkaline by means of ammonia the free 3,10-diaminopyrene is obtained which, after recrystallization, melts at 154° C. and is nearly pure.

(3) 60 parts of nitroacetaminopyrene melting at 254° C. (mixture of 3,8- and 3,10-derivatives, obtainable by nitrating 3-acetaminopyrene with 1 mol of nitric acid in glacial acetic acid) in 300 parts of alcohol are treated with hydrogen at 65° C. to 70° C. in an autoclave provided with a stirrer in the presence of 3 per cent. of a nickel catalyst until the pressure remains constant. After cooling, the whole is filtered with suction and the solid matter is dissolved in 660 parts of hot pyridine, the solution is filtered and the cold saturated filtrate thus obtained is diluted with 300 parts of water; after 2 to 3 hours' standing the 3,8-amino-acetaminopyrene separates which after recrystallization from a mixture of nitrobenzene and chlorobenzene (1:1) melts at 280° C. The aqueous pyridine filtrate is diluted with further 2000 parts of water whereby 3,10-acetamino-aminopyrene separates, and melts at 246° C. By boiling with dilute hydrochloric acid these aminoacetaminopyrenes are saponified and the isomeric diaminopyrenes are obtained in pure state.

The process may also be carried out by saponifying the mixture of the nitroacetaminopyrenes with dilute hydrochloric acid, catalytically reducing the mixture of the nitroaminopyrenes and, thereupon, fractionating the free diamines, as described above.

(4) 42 parts of chloro-nitropyrene, melting at 152° C. (a mixture of 3,8- and 3-10-derivatives, prepared by nitration of 3-chloropyrene in glacial acetic acid with 1 mol. of nitric acid, specific gravity 1.5) in 200 parts of alcohol are treated at 60° C. to 70° C. in an autoclave provided with a stirrer with hydrogen in the presence of 2 per cent. of a nickel catalyst, until the pressure remains constant. After cooling, the whole reaction mass, in which the reduction product is contained partly in the form of a precipitate, is heated with addition of such a quantity of alcohol that in the main only the catalyst remains undissolved in the hot alcohol. The alcoholic solution is filtered while hot. On cooling, an aminochloropyrene crystallizes in the form of long yellow needles which, on recrystallization, show a constant melting point of 142° C. and are the 3,8-chloro-aminopyrene. After standing for a prolonged time the 3,10-chloro-aminopyrene crystallizes from the alcoholic filtrate in the form of yellow leaflets melting at 118° C.

(5) 115 parts of nitro-acetylpyrene (a mixture of 3,8- and 3,10-derivatives, prepared from 3-acetylprene by nitration in glacial acetic acid with 1 mol of nitric acid, specific gravity 1.5) are catalytically reduced in alcohol as described in Example 4.

The mixture of 3,8- and 3,10-aminoacetylpyrene thus obtained is separated by recrystallization from alcohol, in which the 3,8-derivative is more difficultly soluble. It crystallizes from chlorobenzene in the form of orange-yellow prisms, melting at 192° C., whereas the more easily soluble 3,10-aminoacetylpyrene crystallizes in the form of orange-yellow spears, melting at 136° C.

(6) 24.6 parts of pyrene-3-carboxylic acid are finely triturated and suspended in 750 parts of nitrobenzene. At 75° C., a mixture of 7.5 parts of nitric acid (specific gravity 1.5) and 50 parts of nitrobenzene is run in and the whole is heated to 170° C. to 180° C. whereby the suspended matter dissolves entirely. On cooling, a mixture of probably 3,8- and 3,10-nitropyrene-carboxylic acids crystallizes therefrom in the form of yellow needles melting at 270° C. to 285° C. They dissolve in concentrated sulfuric acid to an olive-green and in dilute caustic soda solution to a yellow-red solution.

By catalytical hydrogenation of the aqueous solution of the sodium salts of the two nitro-pyrene-carboxylic acids with the aid of nickel a solution of the corresponding amino-pyrene-carboxylic acids having a light-yellow fluorescence is obtained, which acids are precipitated, by acidification with dilute hydrochloric acid, as salts in the form of thick red-brown flakes. On heating this suspension to boiling, the one isomeride dissolves to a light-yellow solution and separates again, after filtration from the residue which contains the other isomeride, in the form of a viscous yellowish mucilage. By cautiously adding a dilute alkali, the free 3-aminopyrene-10-carboxylic acid is obtained in the form of yellow-brown flakes which dissolve in concentrated sulfuric acid to a green-yellow solution having an intense green fluorescence and in dilute caustic soda solution to a feebly yellow solution having a grey-green fluorescence.

The red-brown residue separated from the hydrochloric solution by filtration is suspended in water and neutralized with dilute caustic soda solution. The isomeric 3-aminopyrene-8-carboxylic acid is obtained in the form of brown flakes and dissolves in concentrated sulfuric acid to a yellow solution having a blue-green fluorescence and a dilute caustic soda solution to a yellow solution having a grey-green fluorescence.

We claim:
1. The compound of the formula:

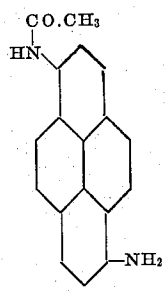

being a compound which, when recrystallized from nitrobenzene-chlorobenzene-mixture, melts at 280 C.

2. Individual substituted 3-aminopyrenes corresponding to the general formula

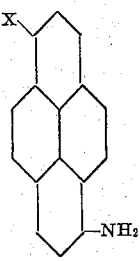

wherein X represents a substituent of the group consisting of acetamino, acetyl, chlorine and carboxyl.

3. The compound of the formula:

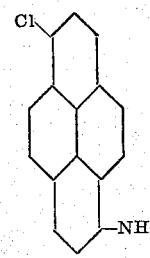

melting at 142° C.

4. The compound of the formula:

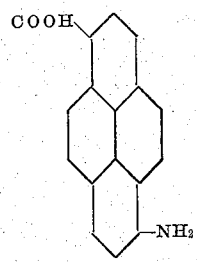

forming brown flakes which dissolve in concentrated sulfuric acid to a yellow solution having a blue-green fluorescence and in dilute caustic soda solution to a grey solution with green fluorescence.

MARTIN CORELL.
HEINRICH VOLLMANN.
HANS BECKER.